United States Patent [19]
Schrey et al.

[11] Patent Number: 5,505,903
[45] Date of Patent: Apr. 9, 1996

[54] METHOD OF PRODUCING COLD-MOULDED IRON-CONTAINING BRIQUETTES

[75] Inventors: Günter Schrey; Gero Tessmer, both of Linz; Karl Katzensteiner, Traun; Klaus Kopper, Leoben, all of Austria

[73] Assignee: Voest-Alpine Industrieanlagenbau GmbH, Austria

[21] Appl. No.: 262,861

[22] Filed: Jun. 21, 1994

[30] Foreign Application Priority Data

Jun. 21, 1993 [AT] Austria ................................ 1212/93

[51] Int. Cl.⁶ ........................ B22F 1/02; B22F 3/02; B22F 8/00
[52] U.S. Cl. ................ 419/64; 75/746; 75/770; 419/62; 419/65
[58] Field of Search .............. 75/746, 770; 419/62, 419/64, 65

[56] References Cited

U.S. PATENT DOCUMENTS

| | | | |
|---|---|---|---|
| 933,269 | 9/1909 | Schumacher | 75/746 |
| 1,741,544 | 9/1926 | Slagle et al. | 75/746 |
| 3,725,034 | 4/1973 | Joseph et al. | 75/4 |
| 3,941,582 | 3/1976 | Baum | 75/4 |
| 4,063,930 | 12/1977 | Kusner et al. | 75/3 |
| 4,369,062 | 1/1983 | Strange | 75/256 |
| 4,585,475 | 4/1986 | Fosnacht | |
| 4,693,864 | 9/1987 | Lloyd | 419/23 |
| 4,778,523 | 10/1988 | Tomari et al. | 75/256 |
| 5,100,464 | 3/1992 | Kelly et al. | |

FOREIGN PATENT DOCUMENTS

| | | |
|---|---|---|
| 3519415 | 12/1985 | Germany. |
| 3727576 | 9/1988 | Germany. |
| 4123626 | 1/1993 | Germany. |

*Primary Examiner*—Donald P. Walsh
*Assistant Examiner*—Scott T. Bluni
*Attorney, Agent, or Firm*—Ostrolenk, Faber, Gerb & Soffen

[57] ABSTRACT

Figure 1:
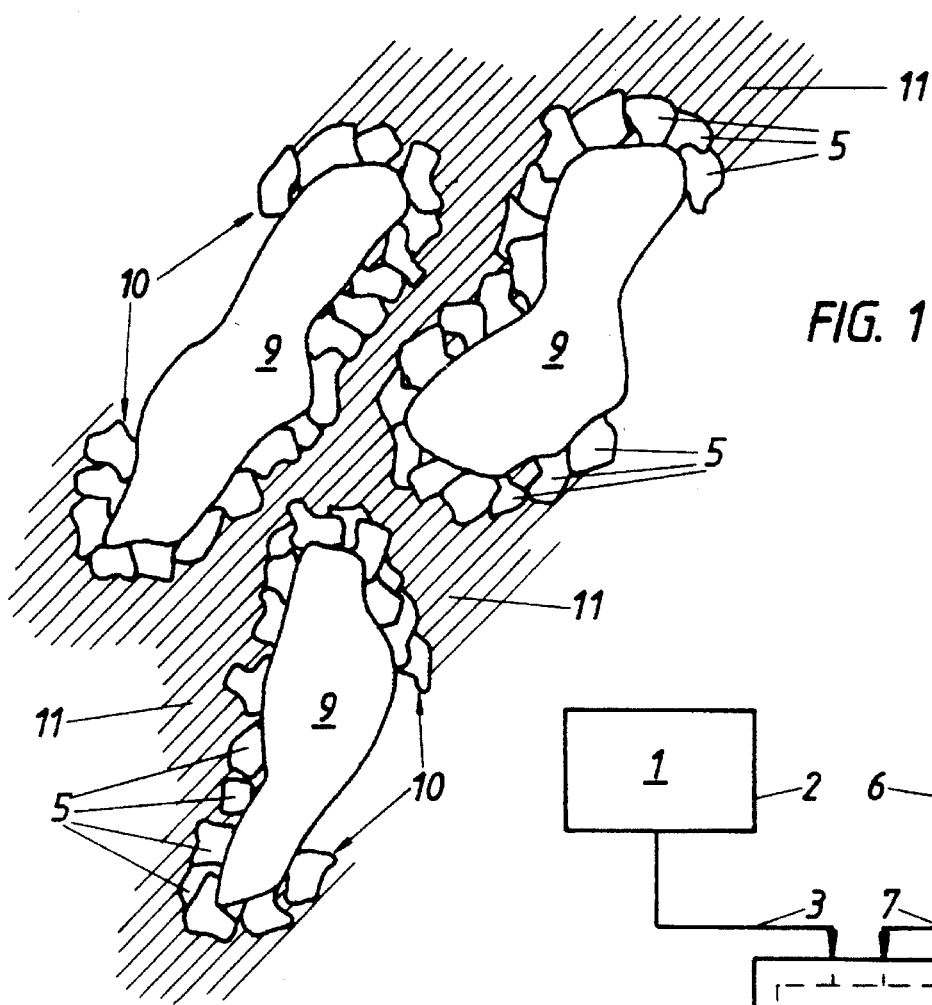

In the manufacture of cold-moulded briquettes from iron-containing waste metallurgical material mixed with a binder, in order to obtain high-strength briquettes and almost complete reducibility, magnetite waste metallurgical material such as scale (1) is mixed with haematite fine material (5) to form a layer (10) of haematite line materials (5) enveloping the individual magnetite particles (9), after which the binder is added to the mixture (FIG. 1).

18 Claims, 1 Drawing Sheet

METHOD OF PRODUCING COLD-MOULDED IRON-CONTAINING BRIQUETTES

The invention relates to a method of producing cold-moulded iron-containing briquettes from iron-containing waste metallurgical material by mixing the waste metallurgical material with a single-component or multi-component binder and subsequent cold moulding.

It is known to agglomerate fine ore, flue dust or other fine-grained iron-containing substances in metallurgical operations. Briquetting has frequently been found useful for this purpose. Since there is an increasing need to avoid dumping waste, there has recently been a progressive increase in the importance of utilising iron-containing by-products of the metallurgical industry, more particularly waste metallurgical substances. The aim, however, is to recycle these waste metallurgical materials or by-products in a particularly inexpensive and eco-friendly manner.

Cold briquetting has been found to be a particularly inexpensive process, but there is no simple way of cold-moulding briquettes with adequate strength, i.e. sufficient strength for using the briquettes in a shaft furnace such as a reduction furnace or blast furnace. The problem of producing briquettes by cold briquetting is the subject e.g. of DE-A-35 19 415 and U.S. Pat. No. 5,100,464.

To obtain adequate strength, according to DE-A-35 19 415 a binder consisting of cement or granulated blast-furnace slag is added to the material for processing. However, the briquette has to be subjected to steam hardening and subsequent drying to ensure adequate final hardening, which is advantageously brought about in an atmosphere of carbon dioxide gas and water-vapour. This method is relatively expensive owing to the thermal after-treatment.

Another disadvantage of this known process for cold-briquetting waste metallurgical materials is that the attainable reduction is often insufficient for use in a reduction shaft furnace. Aggregates containing oxide iron in the form of magnetite ($Fe_3O_4$) have hitherto had to be thermally pretreated in order to convert the oxide iron into haematite ($Fe_2O_3$), since only this substance is directly reducible.

It is known from DE-A-41 23 626 to mix metallurgical residues such as filter dust, scale or grinding dust with a binder and form agglomerates which are dried in the upper burden region of a low-shaft melting unit in counter-current with the rising reaction gases, so that they do not need to be roasted or sintered beforehand. The strength of the agglomerates is sufficient for low-shaft furnaces, but no agglomerates can be manufactured with sufficient mechanical strength for conventional shaft furnaces.

It is known from DE-C-37 27 576 to cast waste metallurgical products such as flue dust, mill sinter or the like with alumina cement and water, into slabs which harden hydraulically, a coarse-grained supporting grain being required for improved bonding of the cement. The hardened slabs are then broken into pieces before use in the blast furnace. This method requires special binders and is also complicated.

The invention aims to avoid these disadvantages and difficulties, the object being to devise a method of the initially-described kind for producing briquettes free from reducing agents, with high strength without thermal pre-treatment or after-treatment, and almost completely reducible, another aim being a simple method of processing mixtures of oxide iron in the form of magnetite and in the form of haematite.

To this end, according to the invention, magnetite waste metallurgical material such as scale is mixed with haematite fine material to form a layer of haematite fine material which envelopes the individual magnetite particles, after which the binder is added.

According to the invention, special importance attaches to enveloping or sheathing the magnetite waste metallurgical materials with haematite fine materials, since this results in easy, efficient direct reducibility. The binder is not added until after the formation of the layer of haematite fine materials surrounding the magnetite particles, so that the sheath is substantially preserved, and the briquettes can be given adequate strength besides being easily reducible. The briquettes manufactured according to the invention can be introduced into a reduction melting unit without affecting the content of magnetite.

Preferably waste water, particularly oil-containing waste water, is added during the process of mixing the magnetite waste metallurgical material with haematite fine material.

To obtain an adequate sheath or layer enveloping the magnetite particles, the haematite fine materials have a particle size between 3.15 and 0.01 mm, preferably 0.5 and 0.02 mm.

Advantageously the binder is slaked lime or molasses. Particularly high strength is attainable by using mixtures of 0.5 to 2 wt. % slaked lime, 2 to 4 wt. % molasses, remainder magnetite waste metallurgical material and haematite fine materials.

A preferred variant of the method according to the invention is characterised by use of mixtures of 30 to 90 wt. % scale, 0.6 to 0.9 wt. % slaked lime, 1 to 5 wt. % molasses and a residue of filter dust and/or shop dust.

A preferred variant is characterised by use of mixtures of about 36 wt. % scale, about 57 wt. % fine material from iron ore and/or iron pellets, about 7 wt. % filter dust and shop dust and about 3 wt. % molasses (relative to scale+fine material+dust).

Figure 2:
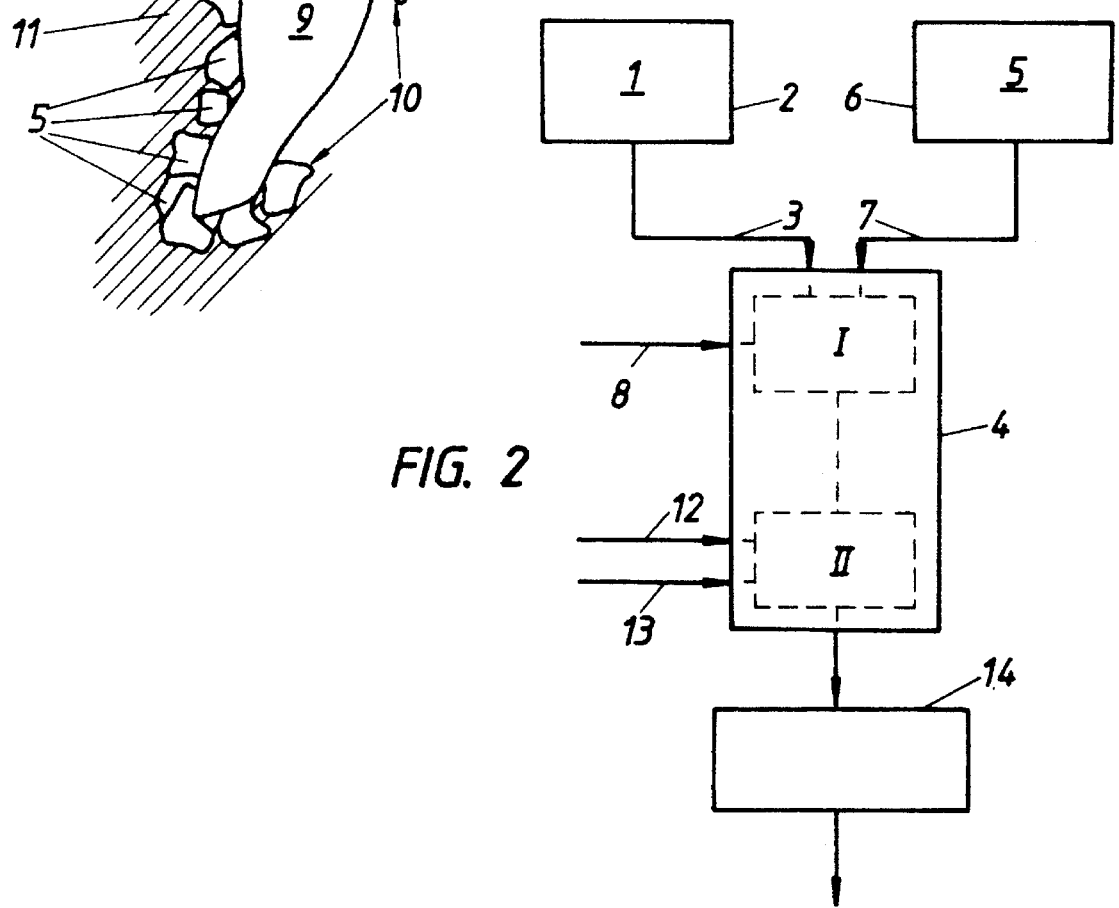

The invention will now be explained in detail with reference to the drawings, in which FIG. 1 is a diagrammatic detail of a section through a cold-moulded briquette on a greatly enlarged scale, and FIG. 2 is a block diagram of the process according to the invention in the form of an example.

Scale 1 formed in an ironworks or steel mill is supplied from a storage container 2 by a conveyor 3 to a mixer 4. Fine material 5 such as fine ore dust from a storage container 6 is simultaneously supplied through a feed line 7 to the mixer 4, in which the scale 1 is mixed with the haematite fine material 5 in a first mixing process I. During the mixing process I, oily waste water is added to the mixture through a feed line 8. During the mixing process I, a layer 10 of haematite fine materials 5 is formed and envelops the magnetite scale particles 9.

The first mixing process I is followed in the same mixer 4 by a second mixing process II in which a binder 11 is added to the mixture, the binder being formed from slaked lime and molasses supplied through separate lines 12 and 13. After the binder 11 has been added, the mixture is removed from the mixer 4 and supplied to a briquetting plant 14. The briquettes can be moulded in variously-constructed plants, such as extruders or piston or screw presses or double roll presses or hand presses etc. Briquetting is performed in the cold, an important feature being that the briquettes need no thermal after-treatment, so that the entire process starting from the scale 1 or haematite fine material 5 can be carried out without any thermal treatment.

The briquettes produced by the method according to the invention are constructed as shown in FIG. 1: magnetite scale particles 9 are surrounded by a layer or sheath 10 consisting mainly of haematite fine materials 5, i.e. the added fine ore dust. This sheath or enveloping layer 10 is formed during the mixing process I. The binder 11 subsequently added during the mixing process II binds the enveloped scale particles 9 together, resulting in very strong briquettes.

The strength (green strength) of the briquettes manufactured according to the invention is between 1700 and 1900 N, whereas the green strength of briquettes manufactured by the prior art is below 1000 N and usually about 400 N. An important additional advantage of the invention is high resistance to abrasion (measured to ISO Standard Othfresen reduction test followed by ISO-RDI drum test). In the case of briquettes with an individual charge size between 16 mm and 6.3 mm, 89.0% have an individual size >6.3 mm.

We claim:

1. A method of producing cold-moulded iron-containing briquettes comprising mixing magnetite waste metallurgical material (1) with hematite fine material (5) to form a layer (10) of hematite fine material (5) which envelopes the individual magnetite particles (9), subsequently adding a binder (11) and cold moulding.

2. A method according to claim 1, characterised in that waste water is added during mixing of the magnetite waste metallurgical material (1) with haematite fine material (5).

3. A method according to claim 1, characterised in that oil-containing waste water is added during mixing of magnetite waste metallurgical material (1) with haematite fine material (5).

4. A method according to claim 1, characterised in that the haematite fine materials (5) have a particle size between 3.15 and 0.01 mm, preferably 0.5 and 0.02 mm.

5. A method according to claim 1, characterised in that the binder (11) is slaked lime.

6. A method according to claim 1, characterised in that the binder (11) is molasses.

7. A method according to claim 1, wherein the binder consists of slaked lime and molasses in weight percents of 0.5 to 2 and 2 to 4 respectively, based on the combined weight of the magnetite metallurgical waste material (1), hematite fine materials (5) and binder used.

8. A method according to claim 1, wherein the magnetite waste metallurgical material is scale, the binder is molasses, said method further including adding at least one of iron ore and iron pellets, and further including adding at least one of filter dust and shop dust, the scale being used in the amount of about 36%, the molasses in the amount of about 3% and the at least one of filter dust and shop dust in the amount of 7%, based on the combined weight of the scale, the hematite fine material, the at least one of iron ore and iron pellets, the binder and the dust.

9. A method according to claim 1, wherein the magnetite waste metallurgical material is scale, the binder consists of slaked lime and molasses, said method further including adding at least one of filter dust and shop dust, the scale being used in the amount of 30 to 90%, the slaked lime in the amount of 0.6 to 0.9% and the molasses in the amount of 1 to 5%, based on the combined weights of the scale, the hematite fine material, the binder and the dust.

10. A method according to claim 2, characterised in that the haematite fine materials have a particle size between 3.15 and 0.01 mm, preferably 0.5 and 0.02 mm.

11. A method according to claim 3, characterised in that the haematite fine materials have a particle size between 3.15 and 0.01 mm, preferably 0.5 and 0.02 mm.

12. A method according to claim 2, characterised in that the binder is slaked lime.

13. A method according to claim 3, characterised in that the binder is slaked lime.

14. A method according to claim 4, characterised in that the binder is slaked lime.

15. A method according to claim 2, characterised in that the binder is molasses.

16. A method according to claim 3, characterised in that the binder is molasses.

17. A method according to claim 4, characterised in that the binder is molasses.

18. A method according to claim 5, characterised in that the binder is molasses.

\* \* \* \* \*